March 30, 1926.  
W. H. FRASSE  
1,578,977
COMBINED CONDENSER AND RESISTANCE UNIT
Filed March 6, 1925
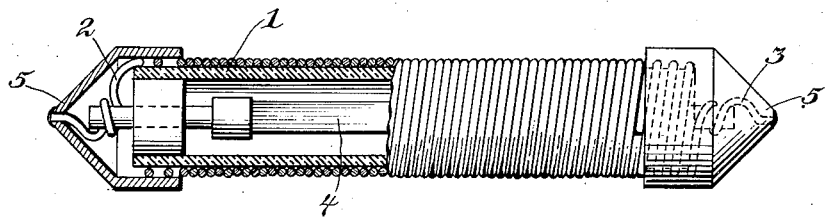
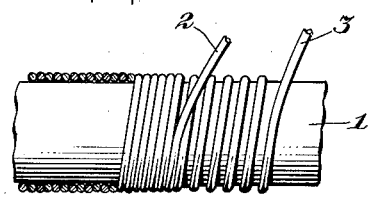  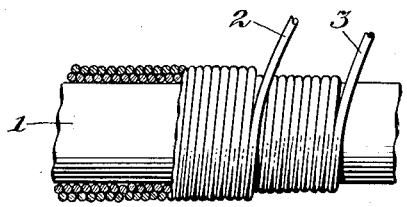
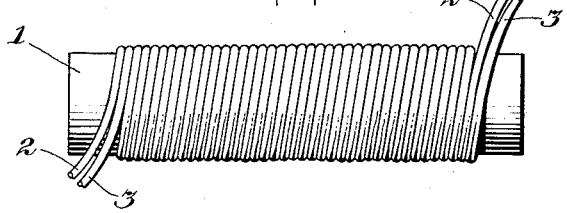
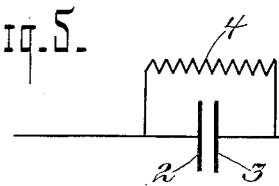
INVENTOR  
William H. Frasse  
BY  
ATTORNEY Patented Mar. 30, 1926.

1,578,977

UNITED STATES PATENT OFFICE.

WILLIAM H. FRASSE, OF NEWARK, NEW JERSEY.

COMBINED CONDENSER AND RESISTANCE UNIT.

Application filed March 6, 1925. Serial No. 13,469.

*To all whom it may concern:*

Be it known that I, WILLIAM H. FRASSE, a citizen of the United States, residing at Newark, in the county of Essex and State of New Jersey, have invented certain new and useful Improvements in Combined Condensers and Resistance Units, of which the following is a specification.

My invention relates generally to condensers as separate elements and also in combination with resistance or other electrical units.

I have found it practicable, in the production of small capacity condensers, to form the condenser members of helical windings of insulated wire, arranged in close relation.

Tests have further demonstrated that the capacity of such condensers may be accurately varied by increasing or decreasing either or both the length of the windings and the diameter of the wire.

In producing condensers as separate elements, enamelled wire is preferably employed, as it permits the windings to be brought into closer relation but, if preferred, cotton or silk covered wire may be used.

In forming the condenser members, the wires may be "parallel" or "double" wound in a single layer upon a core of glass or other insulating material, or "bank" winding may be employed to reduce the length of the condenser, the inner coil forming one member and the outer coil the other.

A small compact and convenient combination of a condenser and resistance may be produced by utilizing the above condenser core of glass or other insulating material as the container for the resistance element and connecting them through the terminal metallic caps either in parallel or series, as occasion may require.

In the accompanying drawings, I have shown several constructions suitable for carrying my invention into effect.

In the drawings:

Fig. 1 is a view in elevation, partly in section, showing the combination of a condenser and a resistance, in which the units or elements are connected in multiple;

Fig. 2 is a detail view showing the double or parallel method of winding the wires forming the condenser members;

Fig. 3 is a similar view showing bank winding;

Fig. 4 shows the condenser as a separate unit, and

Fig. 5 is a wiring diagram of Fig. 1.

Referring now to the drawings, 1 represents a core or glass or other insulating material, preferably tubular and of a length suitable for containing a predetermined number of turns of insulated wire of certain diameter.

The winding is formed of two lengths of wire 2 and 3, which may be arranged in parallel relation, as a single layer upon the core, as shown in Fig. 2, or bank wound, as shown in Fig. 3, with the inner coil forming one condenser member and the outer coil the other condenser member.

As the length of the coils and the diameter of the wire determine the capacity of the condenser, the form of the winding—that is whether parallel or bank is to be employed,—is a matter of engineering judgment, depending upon circuit requirements, design, etc.

Enamelled wire is preferred over cotton, silk or other covered wire, as it permits closer relation of the turns, has superior wearing qualities and presents a better appearance in the finished article.

A small capacity condenser, constructed as above described, lands itself and is particularly well adapted for convenient and compact combination with a resistance element, as shown in Fig. 1.

As illustrated in the drawing, the resistance element 4 is enclosed in a container in the form of a tube of glass or other insulating material closed at the ends by metal caps 5, 5, which serve as contact terminals for connecting the resistance element in circuit.

By utilizing the glass container of the resistance element as the core for the condenser windings and the metal caps as the condenser terminals, I am enabled to produce, as a single compact article, a multiple-connected grid leak and condenser for use in radio receivers, to replace the separate elements, now commonly employed, which require separate sets of spring contact clips and occupy considerable space in a crowded assembly of the various receiver units.

The above reference to the well known grid leak and condenser of a radio receiver, is not to be understood as limiting the application of the invention, as it may obviously be readily adapted for other circuit uses by changing the values of the units combined.

Having, therefore, described my invention, I claim—

A condenser consisting of two helical windings of wire capacitatively disposed relative to each other, a tube of non-conducting material forming a support for the windings, a resistor element mounted in the tube, and closures for the ends of the tube forming contact terminals for the condensers and the resistor element.

WILLIAM H. FRASSE.